March 2, 1965 A. E. SOWERS 3,171,969
MAGNETIC CORE RESET CIRCUIT
Filed March 11, 1959
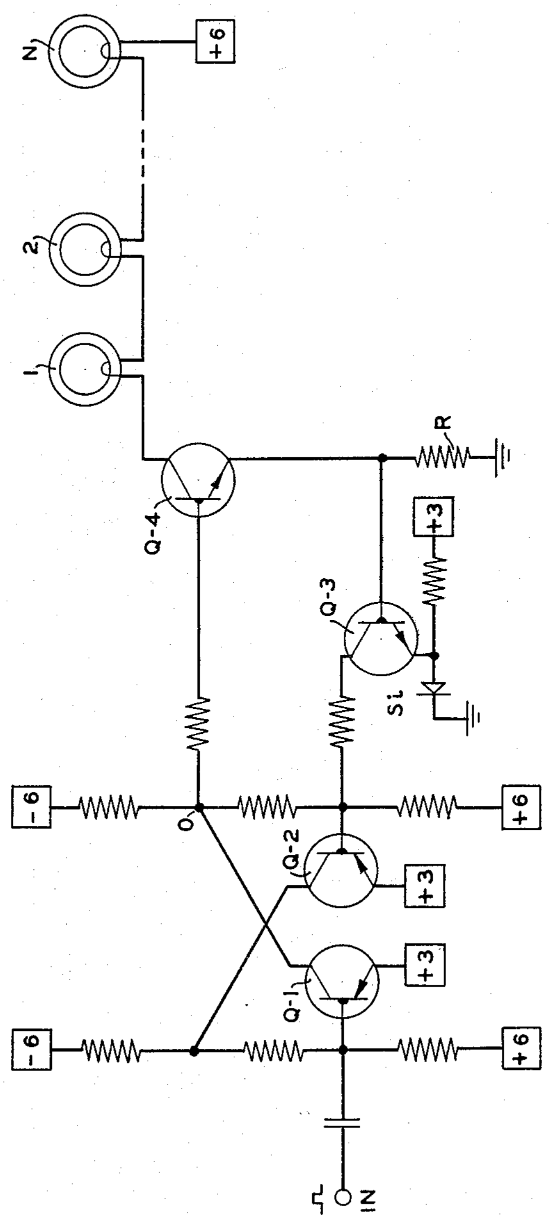
INVENTOR
ANTHONY E. SOWERS
BY
F. H. Henson
ATTORNEY

United States Patent Office 3,171,969
Patented Mar. 2, 1965

3,171,969
MAGNETIC CORE RESET CIRCUIT

Anthony E. Sowers, Rochester, N.Y., assignor to General Dynamics Corporation, Rochester, N.Y., a corporation of Delaware Filed Mar. 11, 1959, Ser. No. 798,673
8 Claims. (Cl. 307—88)

This invention relates to means for controlling bistable magnetic cores and particularly to means for driving a given one thereof to a change in state by the use of a signal commonly applied to a plurality of such cores.

The object of the invention is to provide a means for driving one or more cores out of a plurality to a change in state without dissipating unnecessary power. If within a plurality of N cores, one or more have been previously driven from what might be termed an unset state to a set state, then a force which will act to drive all cores back to an unset state may be applied to all in common for the purpose of driving the said one or more back to the unset state, and the power used for that purpose though applied in an unrestricted manner will not exceed the amount needed for the purpose or be prolonged in its application beyond the minimum time necessary.

This invention employs a semiconductor electronic flip-flop as a means for switching with extreme speed, to first apply a force to cause a change in state in one or more cores grouped together and then to terminate that force without delay when the transition has occurred. The principle of operation of the present invention is to employ the change in circuit values caused by the transition from one state to the other of the cores to act as a control means whereby upon the instant that a transition has been accomplished the circuit may be automatically adjusted. Since the circuit operation depends on no mechanical movements such as the closing of a relay contact and since the transition of a magnetic core from one state to the other is very rapid, the sequence of circuit movements must be equally rapid. Therefore, the means for turning the flip-flop on must be in the form of a pulse of extremely short duration to render the flip-flop subject to reset in an interval thereafter also of extremely short duration. Therefore the pulse used for turning the flip-flop on is the trailing edge of a positive pulse. Since such a pulse may be of any duration it is only the trailing edge thereof which may be used for triggering purposes as such as edge is substantially without duration.

It is known that a coil coupled with a magnetic core has under normal circumstances a very low impedance but that when the core is in transition from one state to the other, its impedance rises to a comparatively high value. Thus, when the said flip-flop is triggered on and current through a plurality of coils each coupled with a magnetic core is caused to flow, the measure of its density is controlled by the impedance of said coils, so that if none exhibits a high impedance, the current will abruptly rise to a high value and since it would not be usefully employed would be considered as being wasted. If, however, one or more of these cores responded to this current and executed a change in state, then the impedance of such coils would be high during the transition and the current density would be low. However, this state is of very short duration, whereupon the overall impedance of the coil circuit falls abruptly and the current density rises abruptly. This abrupt change is then used to reset the flip-flop with the result that the current flow may be stopped as abruptly.

A feature of the invention is the use of transient current phenomena for the application and termination of triggering pulses for driving bistable square loop magnetic memory devices sometimes known as binaries.

The transient current phenomenon accompanying the transition of a binary from one of its stable states to the other is used to limit the current flow during such transition while the abrupt change upon the termination of the said transition, in time like a transient current phenomenon, is employed to entirely terminate the current flow.

Another feature of the invention is the use of the transition of a potential value from a low to a high value as a positive pulse having practically no time duration. Such a minimum width pulse is necessarily employed to trigger the transition of the binaries since the transition induced is extremely rapid and would be followed by an unnecessarly heavy power dissipation. Where no one of the binaries responds, the immediate power dissipation is equally heavy and in both cases must be terminated immediately.

Another feature of the invention is the use of a means for terminating the dissipation of power in direct response to a rise therein whereafter further dissipation of power becomes unnecesary. In accordance with this feature, as the further use of power becomes unnecessary the limitation thereof disappears and it abruptly rises. This abrupt rise is employed as a means to terminate completely the application of such power.

Other features will appear hereinafter.

The drawings consist of a single sheet having a single figure in the form of a schematic circuit diagram.

The invention consists essentially of a flip-flop having its output connected to an NPN transistor which controls a circuit through a plurality of bistable square loop magnetic cores in a series circuit. The flip-flop is normally in a condition in which the transistor Q–2 is conducting and whereby the output O thereof is at a negative potential with respect to the emitter of transistor Q4 and transistor Q4 is held nonconductive. Normally, the impedance of the cores 1, 2 and N is low, even though one thereof may have been driven away from its normal state but, since transistor Q4 is not conducting, no current will flow through this series circuit. However, if an input pulse is applied to the input of the flip-flop, the transistor Q–2 will cease to conduct, the transistor Q–1 will go into conduction, the output O will rise to a positive potential and consequently the transistor Q–4 will start to conduct. This will trigger that core which had previously been driven to its opposite state so that it will now execute a change in state to its normal state. When there is no change in state of a core than the impedance of its winding will appear to be low but if a change in state takes place then the impedance of its winding will appear to be high during the change of state period. Therefore, if the operation of the transistor Q–4 triggers a change of state in any one of the cores 1, 2 or N, the impedance of the series circuit will appear to be high and the current will be limited. However, as the change in state approaches completion there will be an abrupt change in the apparent impedance of the series circuit and consequently an abrupt rise in the current flowing through transistor Q–4. This will produce an abrupt rise in the potential developed across the resistor R whereby the transistor Q–3 will be triggered into conduction. If the abruptly increased current in this series circuit were allowed to persist, there would be excessive power dissipation, but the triggering of the transistor Q–3 immediately acts to drive the flip-flop to its normal condition so that the transistor Q–4 ceases to conduct. Thereupon the transistor Q–3 ceases to conduct and the circuit including the flip-flop is returned to its normal condition.

It will thus be seen that the input pulse (here the trailing edge of a positive pulse) may be of extremely short duration, whereby power for resetting the cores need be supplied only for the length of time required and no longer. Thus the input pulse may be of a minimum duration whereby the drive transistor Q–4 is protected from excessive dissipation since the flip-flop may be restored as abruptly as the series circuit exhibits its lowered impedance on the termination of the change in state of one or another of the said bistable cores.

What is claimed is:

1. Electronic circuit means for driving bistable square loop magnetic elements through a change in state, consisting of a circuit including a transistor and a plurality of coils each coupled with a said magnetic element, said transistor being normally non-conducting, pulse controlled means for rendering said transistor conducting, the impedance value of each of said coils being high during a change in state of its said coupled magnetic element and low thereafter, and a second transistor responsive to a change in said impedance value from a said high to a said low value for rendering said first transistor non-conducting.

2. Electronic circuit means for driving bistable square loop magnetic elements through a change in state, consisting of a circuit including a resistor, a transistor and a plurality of coils each coupled with a said magnetic element, said transistor being in a normally non-conducting state, pulse controlled means for switching said transistor into a conducting state, the impedance value of each of said coils being comparatively high during a change in state of its said coupled magnetic element and comparatively low thereafter, and a second transistor connected to said resistor and responsive to a potential drop thereover for driving said first transistor back to a non-conducting state.

3. Electronic circuit means for driving bistable square loop magnetic elements through a change in state, consisting of a first circuit including a resistor, a transistor and a plurality of coils each coupled with a said magnetic element, said transistor being in a normally non-conducting state, a flip-flop circuit for switching said transistor into a conducting state, the impedance value of each of said coils being comparatively high during a change in state of its said coupled magnetic element and comparatively low thereafter, and a second transistor connected to said resistor and responsive to a potential drop thereover for resetting said flip-flop for terminating the current flow in said first circuit.

4. Electronic circuit means for driving bistable square loop magnetic elements through a change in state, consisting of a first circuit including a resistor, a transistor and a plurality of coils each coupled with a said magnetic element, said transistor being in a normally non-conducting state, a flip-flop circuit for switching said transistor into a conducting state, the impedance value of each of said coils being comparatively high during a change in state of its said coupled magnetic element and comparatively low thereafter, and a second transistor connected to said resistor and responsive to a potential drop thereover during current flow in said first circuit during said low impedance conditions for resetting said flip-flop for terminating the current flow in said first circuit.

5. Electronic circuit means for driving bistable square loop magnetic elements through a change in state, consisting of a first circuit including a resistor, a transistor and a plurality of coils each coupled with a said magnetic element, said transistor being in a normally non-conducting state, a flip-flop circuit for switching said transistor into a conducting state, means for triggering said flip-flop on by a pulse of extremely short duration, the impedance value of each of said coils being comparatively high during a change in state of its said coupled magnetic element and comparatively low thereafter, and a second transistor connected to said resistor and responsive to a potential drop thereover during current flow in said first circuit during said low impedance conditions for triggering said flip-flop off for terminating the current flow in said first circuit.

6. Electronic circuit means for driving bistable square loop magnetic elements through a change in state, consisting of a first circuit including a resistor, a transistor and a plurality of coils each coupled with a said magnetic element, said transistor being in a normally non-conducting state, a flip-flop circuit for switching said transistor into a conducting state, said flip-flop being responsive to the trailing edge of a pulse of an otherwise indetermintae duration, the impedance value of each of said coils being comparatively high during a change in state of its said coupled magnetic element and comparatively low thereafter, and a second transistor connected to said resistor and responsive to a potential drop thereover during current flow in said first circuit during said low impedance conditions for triggering said flip-flop off for terminating the current flow in said first circuit.

7. Electronic circuit means for driving bistable square loop magnetic elements through a change in state, consisting of a first circuit including in series a resistor, a transistor and a plurality of coils each coupled with a said magnetic element, said transistor being in a normally non-conducting state, a flip-flop circuit for switching said transistor into a conducting state, said flip-flop being responsive to a pulse of extremely short duration, the impedance value of each of said coils being comparatively high during a change in state of its said coupled magnetic element and comparatively low thereafter, and a second transistor connected to said resistor and responsive to a potential drop thereover during current flow in said first circuit during said low impedance conditions for triggering said flip-flop off for terminating the current flow in said first circuit.

8. Electronic circuit means for driving bistable square loop magnetic elements through a change in state, comprising a coil coupled to each of said elements, a source of potential, control means for selectively applying said potential to said coils, whereby a current of a magnitude determined by the instantaneous impedance of said coils will flow from said source of potential through said coils, said current magnitude being below a predetermined value only while said magnetic elements are being driven through a change in state, and current responsive means coupled to said control means for terminating the flow of said current through said coils only in response to the magnitude of said current having at least said predetermined value.

References Cited in the file of this patent

UNITED STATES PATENTS

| | | |
|---|---|---|
| 2,591,961 | Moore et al. | Apr. 8, 1952 |
| 2,747,110 | Jones | May 22, 1956 |
| 2,770,732 | Chong | Nov. 13, 1956 |
| 2,816,964 | Giacoletto | Dec. 17, 1957 |
| 2,887,542 | Blair et al. | May 19, 1959 |
| 2,920,213 | Elias | Jan. 5, 1960 |
| 2,956,174 | Tulp | Oct. 11, 1960 |

OTHER REFERENCES

"Handbook of Semiconductor Electronics" (Hunter), published by McGraw-Hill, 1956 (pp. 15–38 to 15–41 relied on).